Nov. 21, 1967  J. J. LOVINGHAM  3,353,358
ROCKET MOTOR CONSTRUCTION
Filed May 3, 1965
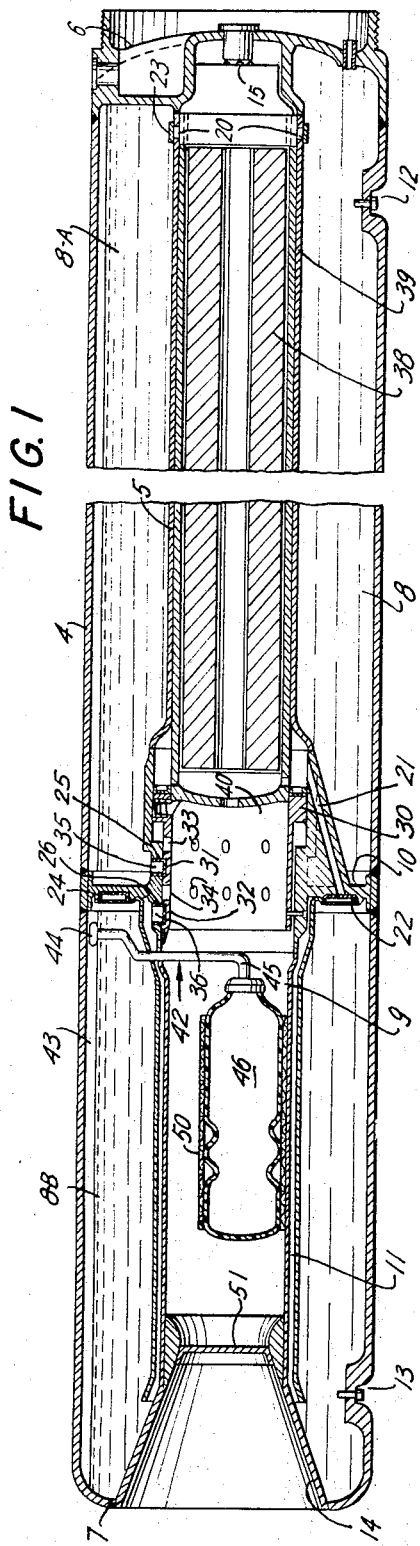
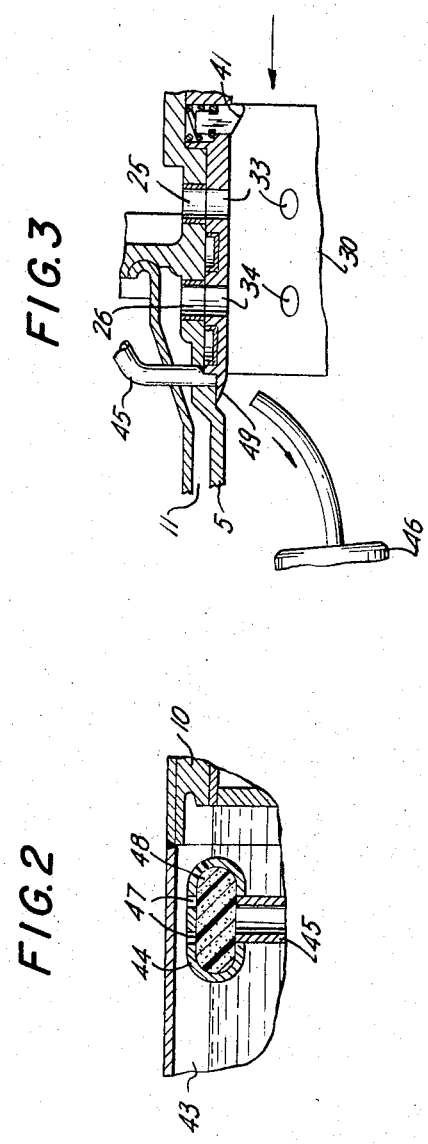
INVENTOR
JOSEPH J. LOVINGHAM
BY
Curtis, Morris & Safford
ATTORNEYS United States Patent Office 3,353,358
Patented Nov. 21, 1967

3,353,358
ROCKET MOTOR CONSTRUCTION
Joseph J. Lovingham, Madison, N.J., assignor to Thiokol Chemical Corporation, Bristol, Pa., a corporation of Delaware
Filed May 3, 1965, Ser. No. 452,497
8 Claims. (Cl. 60—259)

The present invention relates to an improved construction in rocket motors and more particularly to a device for purging non-condensible gases from closed vessels in said motor in which liquid propellant is stored.

Rocket motors using liquid propellants have a tank structure for storing the propellants and it is desirable to provide a maximum "loading density" (actual volume of propellant divided by the total volume of the storage tank). However, loading a rocket motor with liquid propellant at a maximum loading density presents a problem because of the minute, irreversible decomposition of the propellant which causes a high pressure to build up in the tank. For example, the decomposition of only 0.124% of hydrazine contained in a sealed system with a 3% ullage can produce a tank pressure as high as 1,000 p.s.i.

Furthermore, the pressure produced is inversely proportional to the ullage space so that with a small ullage the pressure increases to a high value, but with a large ullage the pressure build-up is much less. However, increasing the ullage decreases the amount of fuel and weight of the rocket motor which can be propelled. On the other hand, if the rocket motor is so filled with liquid propellant as to produce a high loading density, the high pressure produced requires a stronger tank with thicker walls which increases the weight of the tank. Therefore, in the design of a rocket motor a compromise between maximum loading density and weight of the storage tank is usually made which will produce the greatest thrust for the particular motor.

One of the objects of the present invention is to provide a construction in a rocket motor which will, in effect, increase the ullage space of a tank for storing liquid propellant without increasing its dimensions to permit a high loading density.

Another object is to provide a construction in a rocket motor for extending the ullage space of a propellant tank into the empty thrust space where combustion and exhaust of gases occurs.

Another object is to provide a construction in a rocket motor which permits storage of liquid propellant at a maximum loading density without danger of increasing the pressure in the storage tank to extremely high values.

Another object of the present invention is to provide an improved structure in a rocket motor for increasing the loading density which is of simple and compact construction, adapted to be manufactured at a cost substantially the same as conventional structures and one which is reliable in operation to prevent a build up of excessively high pressures at high loading density.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a longitudinal sectional view of a rocket motor incorporating the novel features of the present invention and showing the structure for purging non-condensible gases from the propellant storage tank to prevent a build up of excessive pressure in said tank;

FIGURE 2 is an enlarged detailed view of the perforated collector through which gas flows from the ullage space in the storage tank; and FIGURE 3 is an enlarged sectional view of the slide valve to show the manner in which the connecting tube is severed when the rocket engine is to be fired.

FIGURE 1 of the drawings shows one physical embodiment of the present invention applied to a rocket motor of the type described and claimed in the United States Letters Patent to A. Sherman et al. No. 3,094,837 issued June 25, 1963. This rocket motor comprises a casing having an outer peripheral wall 4 and an inner peripheral wall 5 connected between headers 6 and 7 at the forward and aft ends to define an annular space 8 therebetween and an axial combustion chamber 9 within the inner wall. A bulkhead 10 extends between the outer wall 4 and the inner wall 5, intermediate the ends thereof, to divide the annular space 8 into a forward tank section 8–A for liquid oxidizer and an aft tank section 8–B for liquid fuel. Tubular baffles 11 closely surround the inner wall 5 between the combustion chamber and aft tank section 8–B and extend from the bulkhead 10 rearwardly to the aft header 7. When the tank section 8–B is pressurized, liquid propellant fuel flows through the passages of baffles 11 to cool the wall of the combustion chamber 9.

Suitable propellants are inhibited red fuming nitric acid (IRFNA) containing approximately 18–23% $NO_2$ as the oxidizer in tank section 8–A and unsymmetrical dimethyl hydrazine (UDMH) as liquid fuel in tank section 8–B, respectively. The tank sections 8–A and 8–B are provided with filler openings 12 and 13, respectively, which are hermetically sealed after the tank sections are filled. An exit cone or nozzle 14 is provided at the outlet end of the combustion chamber 9 and an igniter 15 closes the forward end of the combustion chamber. The combustion chamber 9 and exit cone or nozzle 14 are defined in the claims as a "thrust chamber."

The inner tank wall 5 has a plurality of circumferentially spaced orifices 20 adjacent the forward end of the tank section 8–A for pressurizing the tank section, while bulkhead 10 has a plurality of passages 21 terminating in pressurizing orifices 22 at the forward end of tank section 8–B for pressurizing that tank section. Orifices 20 and 22 are sealed by burst bands 23 and 24 which are designed to withstand handling loads. The intermediate section of the innner wall 5 having bulkhead 10 also is provided with rows of circumferentially spaced injection orifices 25 and 26 between the combustion chamber 9 and tank sections 8–A and 8–B, respectively. A slide valve 30 has lands 31 and 32 which overlie the injection orifices 25 and 26 during storage and rows of orifices 33 and 34 which align with the injection orifices when the slide valve 30 is moved to its firing position, as shown in FIGURE 3.

During storage and handling, the liquid propellant tank sections 8–A and 8–B are sealed by shearing cups 35 and 36 seated in the orifices 25 and 26 supported in partially drilled holds in the lands 31 and 32 of slide valve 30. Thus, the cups 35 and 36 are sheared when the slide valve 30 is moved from an inoperative storage position, shown in FIGURE 1, to its operative firing position, shown in FIGURE 3.

A solid propellant gas generator is mounted in the forward end of the combustion chamber 9. The gas generator comprises an annular stick of the solid combustible material 38 mounted in a holder 39 having a metal sleeve with a perforated flow restricting disk 40 at its rearward end. The gas generator is slid into position in the combustion chamber 9 and latched to the forward end of slide 30 by spring pressed dogs 41, see FIGURE 3. The ends of the pressurizing passages 21 terminate adjacent the perforated disk 40 to deliver gaseous products of combustions from he gas generating material 38 to burst the band 24 and enter the forward end of the tank section 8–B. Gaseous products of combustion from the open end of the holder 9 also burst the band 23 and enter the forward end of tank section 8–A through the ports 20. In addition the products of combustion from the solid material 38 act as an igniter for the liquid propellants and also as a propellant for the rocket motor. As thus far described the invention is substantially identical with that illustrated and described in the Sherman et al. patent, referred to above.

In accordance with the present invention a device 42 is provided for continuously purging gases from the ullage space 43 of the tank section 8–B to prevent build up of excessive pressure in the tank. In its broadest aspect the purging device 42 comprises a collector 44 in the ullage space 43 of the tank 8–B, as shown in FIGURES 1 and 2, and a tube 45 connecting the collector to the exterior of the tank. In the specific embodiment illustrated the connecting tube 45 extends through the inner wall 5 of the tank section 8–B into the combustion chamber 9 and its end is connected to an expansible container 46. Container 46, in effect, performs the double function of extending the ullage space 43 of the tank section 8–B and provides a chemically inert holder for the gas purged from the tank section.

The collector 44 is located as closely as possible to the outer wall 4 and bulkhead 10 to always position the collector in the ullage space 43 where non-condensible gas resulting from the decomposition of the propellant fuel will occur, either in a stored horizontal or vertical stand-up position of the rocket motor. The collector head 44 has perforations 47 in the sides adjacent the casing wall 4 and bulkhead 10 through which the non-condensible gases may flow into the purging device 42.

A plug 48 of a filter material is provided in the purging device 42 having pores which will permit the flow of gas therethrough but prevent the flow of liquid. The filter plug 48 may be composed of any suitable gas permeable-liquid impermeable material such as a porous fluoro-carbon resin. One such porous fluoro-carbon resin suitable for this purpose is sold under the tradename "Kel-F." This plug of filtering material 48 may be located anywhere in the collector 44 and tube 45, but preferably is located in the collector head, as shown in FIGURE 2, to prevent liquid from entering the head. However, when the rocket motor is stored in the horizontal position illustrated in FIGURE 1, or when it is stored in a stand-up position the collector head 44 will be in the ullage space 43 so that gas may enter through the perforations 47. In place of plug 48, a gas permeable-liquid impermeable membrane of silicone polymer may be used.

The tube 45 extending through the inner wall 5 of the tank section 8–B is sealed thereto to prevent leakage and is located adjacent the end of the slide 30. The end of slide 30 has a shearing edge 49 so that when it is moved from the position illustrated in FIGURE 1 to that illustrated in FIGURE 3, it will shear the tube and deform the sheared edge to seal it closed.

When an expansible container 46 is used to confine the purged gas it may be enclosed in a metal screen retainer 50 to limit its expansion to a diameter less than the throat of the nozzle 14. The throat of the nozzle 14 is normally closed by a cover 51 which is blown out by the gas produced by burning of the solid propellant 38, and which also consumes and/or blows out the container 46 and its retainer 50. One form of the invention having now been described in detail its mode of operation is next explained.

Each of the tank sections 8–A and 8–B are filled with the liquid oxidizer and fuel, respectively, through the ports 12 and 13 after which the ports are sealed. The rocket motor is loaded at a high loading density to provide a minimum ullage space 43. After loading with a fuel and oxidizer the rocket motor is stored either in a horizontal position on a rack, or in an upright standing position with the nozzle end down. In either case the collector head 44 will be positioned in the ullage space of the tank section 8–B. Decomposition of the fuel, hydrazine, during storage will produce non-condensible gas which, if not purged, would produce excessive pressure in the small ullage space. However, these gases are continuously purged from the tank section 8–B through the perforations 47 in the collector head 44 and tube 45 to the expansible container 46. Filter plug 48 permits the flow of gas therethrough but prevents the flow of liquid. The container 46 into which the gases are purged is adapted to expand as the gases accumulate to, in effect, increase the ullage space 43 and thereby decrease the pressure in the tank section 8–B.

To fire the rocket motor the igniter 15 is set-off to produce a flame which, in turn, ignites the solid propellant 38 of the gas generator. Burning of the solid propellant 38 produces hot gases at a pressure to burst the bands 23 and 24 and a supply a pressurized motive fluid to the front of each of the tank sections 8–A and 8–B. Simultaneously, the pressure of the gas operates the slide valve 30 from the position illustrated in FIGURE 1 to that illustrated in FIGURE 3 to shear the cups 35 and 36 in the orifices 25 and 26 and align the orifices 33 and 34 in the slide therewith. The movement of the slide valve 30 also shears the connecting tube 45 of the purging device 43 as shown in FIGURE 3. The hot gases from the solid fuel 38 ignites the liquid fuel, hydrazine, in the presence of an oxidizer, fuming nitric acid. Burning of the fuel immediately produces a pressure and blows out the plug 51 from the throat of the nozzle 14 after which the severed container 46 also is discharged from the chamber through the nozzle. The fuel continues to burn in the presence of its oxidizer which, in flowing through the nozzle 14, produces a forward thrust on the rocket motor.

It will now be observed that the present invention provides a device for purging liquid propellant tanks in a rocket motor of non-condensible gas which, in effect, increases the ullage space of the tank without increasing its actual volume to permit a high loading density. It will also be observed that the present invention provides a construction in a rocket motor which permits storage of liquid propellant at a maximum loading density without danger of increasing the pressure in the storage tank to extremely high values. It will still further be observed that the present invention provides a purging device of relatively simple and compact construction which may be economically manufactured and one which is reliable in operation to perform its intended function.

While a single embodiment of the invention is herein illustrated and described, it will be understood that changes may be made in the structure and arrangement of elements without departing from the spirit or scope of the invention. Therefore, without limitation in this respect the invention is defined in the following claims.

1. In a rocket motor of the type having a thrust chamber and a tank separated by a wall and in which the tank stores at least one propellant liquid which is apt to decompose and produce a high pressure functionally related inversely to the ullage space in said tank, that improvement which comprises providing a continuous connection between a location in said tank where gas collects and the thrust chamber prior to operation of said thrust chamber, said connection extending through the wall of said tank and sealed thereto, and a purging device in said connection of a material which is gas permeable-liquid impermeable to form a barrier in said connection to vent said gas from the tank whereby to permit a high loading density and minimum ullage without producing excessive pressures.

2. A rocket motor comprising a casing having inner and outer walls of generally cylindrical shape to provide an annular tank and inner thrust chamber, a nozzle at the outlet from the thrust chamber, a propellant liquid in said annular tank, an expansible container in the thrust chamber, a tube extending through the inner casing wall and connecting the tank to the expansible container, and a porous filter associated with said tube which permits gas to flow from the tank to the expansible container while preventing the flow of the liquid therethrough.

3. In a rocket motor of the type having a combustion chamber with an outlet nozzle and a tank for storing at least one propellant liquid which is apt to decompose and produce a high pressure functionally related inversely to the ullage in said tank, that improvement which comprises, providing an expansible gas container in the combustion space, a gas collector at the highest point in the tank where gas collects, a connection between the gas collector and container extending through and sealed to the wall of said tank, and a gas permeable-liquid impermeable filter in the connection to permit gas to flow from the tank into the expansible gas container whereby to permit a high loading density with a minimum ullage without producing excessive pressure therein.

4. A rocket motor in accordance with claim 3 in which the expansible container in said combustion chamber is a plastic bag and the filter is a porous fluoro-carbon material.

5. A rocket motor in accordance with claim 3 in which a slide is provided in the combustion chamber and having a shearing edge, and means for actuating the slide to shear the connection between the gas collector and expansible container to release it for discharge through the nozzle when the motor is to be fired.

6. A rocket motor in accordance with claim 5 in which the means for actuating the slide is a gas generator in the combustion chamber at one side of the slide, and means for igniting the gas generator.

7. A rocket motor in accordance with claim 6 in which the gas generator produces a motive fluid for forcing the liquid from the annular tank space into the combustion chamber.

8. A rocket motor in accordance with claim 3 in which the tank has inner and outer cylindrical walls to form an annular tank space therebetween and a cylindrical combustion chamber within the inner wall, ports in the inner wall between the annular tank space and combustion chamber, a slide valve having ports for alignment with the ports in the inner wall to deliver liquid from the annular tank space to the combustion chamber, means for actuating the slide, and said slide being so constructed and arranged as to shear the connection between the gas collector and expansible container to release it for discharge through the outlet nozzle.

References Cited

UNITED STATES PATENTS 3,224,189   12/1965   Kenny _____ 60—259

CARLTON R. CROYLE, *Primary Examiner.*

D. HART, *Assistant Examiner.*